Figure 1:
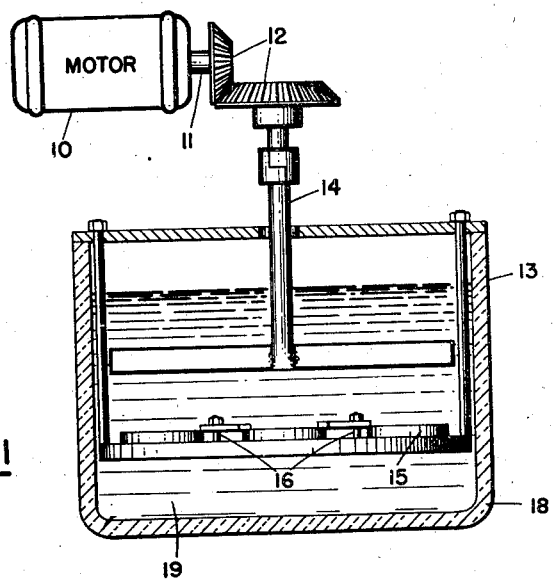

Jan. 21, 1947.  T. O. BRANDON  2,414,439
METHOD OF TESTING ABRASION RESISTANCE
Filed Feb. 16, 1945

Inventor
THOMAS O. BRANDON
By M. A. Hayes
Attorney

Patented Jan. 21, 1947

2,414,439

UNITED STATES PATENT OFFICE 2,414,439

METHOD OF TESTING ABRASION RESISTANCE

Thomas O. Brandon, United States Navy

Application February 16, 1945, Serial No. 578,271

3 Claims. (Cl. 73—7)

(Granted under the act of March 3, 1883, as amended April 30, 1928; 370 O. G. 757)

This invention relates to a method of testing the hardness, and particularly the resistance to abrasion, of material surfaces or of coatings thereon. It is especially well adapted to measuring the relative resistance to abrasion of coatings such as those provided on various glass or plastic surfaces to reduce the reflection of light therefrom.

A variety of methods have been proposed and used for testing and measuring the resistance to abrasion of various surfaces. However, in many cases, the nature of such methods has made difficult, if not impossible, the setting up of standard test procedures which can be repeated at will with uniform results. This is particularly true when dealing with coatings on glass, for no satisfactory test for the abrasion resistance of reflection-reducing coatings on glass is known. At present, such quantitive tests as rubbing the film with an eraser or scraping it with a razor blade are in use. Obviously, such more or less arbitrary procedures are entirely inadequate, for the entire optical surface is never subjected to test, and it is difficult to control and determine the pressure exerted on the coating, especially when dealing with curved surfaces. Further, as regards the rubber eraser test, the composition of any specific type of rubber eraser is not sufficiently constant to permit adoption of the material as a standard abrader.

It is an object of this invention to provide an improved method of testing the abrasion resistance of surfaces and of coatings thereon. A more particular object is to provide such a method which is useful to test the resistance to abrasion of reflection-reducing coatings on glass and on other materials, including plastics, where coatings of this nature are used.

Figure 2:
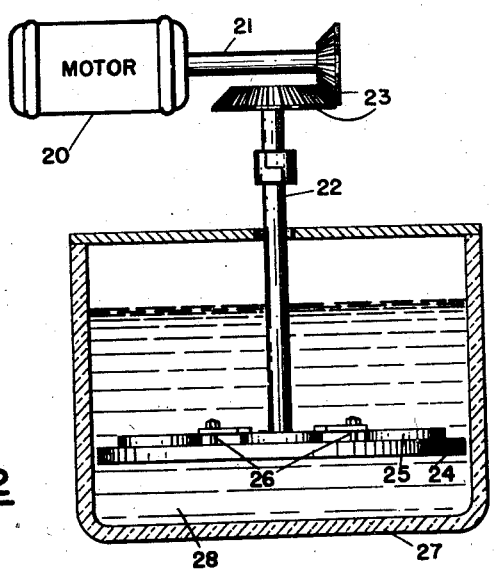

Other and further objects of this invention will become apparent and the invention will be best understood from the following description of an embodiment thereof, reference being had to the drawing in which:

Figure 1 is a section in elevation of one embodiment of the invention showing the test material being held stationary in an agitated liquid, and Figure 2 shows a section in elevation of another embodiment of the invention with the material being tested revolving through the liquid.

Referring in more particular to the drawing, in Figure 1, a motor 10 has shaft 11 and gears 12 attached to it. Agitator paddle 13 is attached to shaft 14 and to the gears 12. The material 15 to be tested is attached by clip 16 to plate 17 submerged in container 18 of liquid 19.

In Figure 2, motor 20, shafts 21 and 22 with suitable gears 23 imparts rotary motion to plate 24 on which are test pieces 25 secured by clips 26 and submerged in container 27 of liquid 28.

As will be seen from these illustrations, a positive and controlled abrasive action is applied to the test pieces by either of the two embodiments shown, but such drawing as submitted are to be taken as primarily illustrative and it is intended that the disclosure shall cover by suitable expression in the appended claims whatever features of patentable novelty exist in the invention disclosed.

It is my discovery that the foregoing objects may be achieved by subjecting the surface under test to the abrasive action of an abrasive suspended in a liquid. In carrying out the invention, the test sample is submerged in the liquid in which the abrasive is suspended, and, either by agitating the liquid or by moving the sample, relative motion is set up between the sample and the liquid. The particles of abrasive in the liquid are thereby caused to strike and scratch the surface under test. This test procedure measures the relative resistance to abrasion of the surface or of the coating thereon, and uniform results may readily be obtained by using a particular grade and quality of abrasive, and by controlling the time and other conditions of operation of the test. The use of an abrasive suspended in a liquid medium precludes the variation in test results obtained when a dry abrasive is used under varying conditions of humidity.

The abrasive chosen by me as being particularly well adapted to the measurement of the relative resistance to abrasion of the various types of reflection-reducing coatings provided on glass, plastic, and other material surfaces, is one consisting of powdered feldspar of a composition and fineness which has been adopted as standard by the Porcelain Enamel Institute for use in the testing of porcelain enamel. The specifications for this abrasive are grade 65–41, 140 mesh. This particular abrasive was chosen because it attacks coatings of the reflection-reducing type, including baked and unbaked fluoride coatings as well as spun coatings, but does not attack glass.

To illustrate the manner in which this invention finds application, the following example is given. The liquid used as the test medium consisted of one-half gallon of tap water in which 2.2 pounds of the powdered abrasive were suspended. Glass specimens bearing, respectively, unbaked fluoride coatings, baked fluoride coatings, and spun coatings were immersed in the liquid, and each sample was rotated approximately 125 times per minute in the liquid through a circular path measuring about 3.75 inches in diameter. After being subjected for one hour in this fashion to the action of the suspended abrasive, the unbaked fluoride coating was observed to be scratched and worn off in spots, while the other coatings showed no appreciable deterioration and were therefore deemed to be satisfactory for use on a commercial scale.

Within the scope of the appended claims, various modifications and changes in the nature and proportions of the ingredients may be made by those skilled in the art without departing from the nature of the invention.

The invention described herein may be manufactured and used by or for the Government of the United States of America for governmental purposes without the payment of any royalties thereon or therefor.

What is claimed is:

1. The method of measuring the relative resistance to abrasion of a reflection-reducing coating on glass and plastic surfaces, comprising immersing the material bearing the coating in a suspension of substantial proportions of a finely divided solid abrasive in water; and setting up controlled relative motion between the coating and the suspension; the relative resistance to abrasion of the coating being shown by the extent of the destruction of said coating under controlled conditions of operation.

2. The method of measuring the relative resistance to abrasion of a reflection-reducing coating on glass and plastic surfaces, comprising immersing the material bearing the coating in an aqueous suspension of powdered feldspar; and setting up controlled relative motion between the coating and the suspension; the relative resistance to abrasion of the coating being shown by the extent of the destruction of said coating under controlled conditions of operation.

3. The method of determining the relative resistance to abrasion of baked fluoride, unbaked fluoride, and spun, reflection-reducing coatings on glass, comprising immersing said coated glass in a suspension made up of water and powdered feldspar of the type designated by the Porcelain Enamel Institute as grade 65-41, 140 mesh, said materials being present in the suspension in the proportion of one-half gallon of water to 2.2 pounds of feldspar; and causing the coated glass to be rotated in said suspension for a period of about one hour through a circle approximately 3.75 inches in diameter about 125 times per minute.

THOMAS O. BRANDON.